United States Patent
Wang et al.

(10) Patent No.: US 10,254,874 B2
(45) Date of Patent: Apr. 9, 2019

(54) TOUCH SCREEN, METHOD OF MANUFACTURING THE SAME AND DISPLAY PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qingpu Wang, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 375 days.

(21) Appl. No.: 14/771,558

(22) PCT Filed: Mar. 17, 2015

(86) PCT No.: PCT/CN2015/074353
§ 371 (c)(1),
(2) Date: Aug. 31, 2015

(87) PCT Pub. No.: WO2016/065800
PCT Pub. Date: May 6, 2016

(65) Prior Publication Data
US 2016/0364063 A1 Dec. 15, 2016

(30) Foreign Application Priority Data
Oct. 31, 2014 (CN) .......................... 2014 1 0609650

(51) Int. Cl.
*G06F 1/32* (2006.01)
*G06F 3/041* (2006.01)
(Continued)

(52) U.S. Cl.
CPC .......... *G06F 3/0416* (2013.01); *G06F 1/3262* (2013.01); *G06F 3/044* (2013.01);
(Continued)

(58) Field of Classification Search
None
See application file for complete search history.

(56) References Cited

U.S. PATENT DOCUMENTS 9,824,254 B1 * 11/2017 Yazdandoost ........ G06K 9/0002
2003/0067448 A1 4/2003 Park
(Continued)

FOREIGN PATENT DOCUMENTS

CN 101615091 A 12/2009
CN 102236447 A 11/2011
(Continued)

OTHER PUBLICATIONS

Office Action in Chinese Patent Application No. 201410609650.6, dated Sep. 26, 2016.
(Continued)

*Primary Examiner* — Nitin Patel
*Assistant Examiner* — Amen Bogale
(74) *Attorney, Agent, or Firm* — Brooks Kushman P.C.

(57) ABSTRACT

A touch screen includes a first electrode and a second electrode that are disposed oppositely, and a sensing layer disposed between the first electrode and the second electrode. The sensing layer is made of transparent material having piezoelectric effect. The touch screen can sense pressure by any object, and therefore cannot only sense a position of a contact, but also sense a magnitude and a change characteristic of acting force. Also, the touch screen according to the present disclosure directly converts the pressure applied by the object onto the touch screen into an electric signal, which reduces the power consumption
(Continued)

greatly, and therefore reduces whole power consumption of the screen effectively.

14 Claims, 4 Drawing Sheets

(51) Int. Cl.
    *G06F 3/044*      (2006.01)
    *G06F 3/045*      (2006.01)
    *G06F 1/3234*      (2019.01)

(52) U.S. Cl.
    CPC ............ *G06F 3/045* (2013.01); *G06F 3/0412* (2013.01); *G06F 3/0414* (2013.01); *G06F 2203/04103* (2013.01); *G06F 2203/04104* (2013.01); *G06F 2203/04105* (2013.01)

(56) References Cited

U.S. PATENT DOCUMENTS

| | | | |
|---|---|---|---|
| 2005/0099401 A1* | 5/2005 | Matsumoto | G06F 3/045 345/173 |
| 2009/0309843 A1* | 12/2009 | Kim | G06F 3/0414 345/173 |
| 2011/0261021 A1 | 10/2011 | Modarres et al. | |
| 2012/0292162 A1* | 11/2012 | Jeong | G06F 3/045 200/181 |
| 2013/0335371 A1* | 12/2013 | Bayramoglu | G06F 3/041 345/174 |
| 2014/0152618 A1* | 6/2014 | Ando | G06F 3/044 345/174 |
| 2016/0117034 A1* | 4/2016 | Day | G06F 3/0414 345/174 |
| 2016/0153845 A1* | 6/2016 | Kawamura | H01L 41/047 73/862.629 |

FOREIGN PATENT DOCUMENTS

| | | |
|---|---|---|
| CN | 102460351 A | 5/2012 |
| CN | 102819351 A | 12/2012 |
| CN | 202771390 U | 3/2013 |
| CN | 203204583 U | 9/2013 |
| CN | 203217542 U | 9/2013 |
| CN | 104281328 A | 1/2015 |
| CN | 204087159 U | 1/2015 |

OTHER PUBLICATIONS

International Search Report and Written Opinion in PCT International Application No. PCT/CN2015/074353, dated Jun. 26, 2015.

* cited by examiner

TOUCH SCREEN, METHOD OF MANUFACTURING THE SAME AND DISPLAY PANEL

CROSS-REFERENCE TO RELATED APPLICATIONS

This application is the U.S. National Phase of PCT Application No. PCT/CN2015/074353 filed on Mar. 17, 2015, which claims the priority of Chinese Patent Application No. 201410609650.6 filed on Oct. 31, 2014, the disclosures of which are incorporated herein by reference.

TECHNICAL FIELD

The present application relates to the field of display technology, in particular to a touch screen, a method of manufacturing the same, and a display panel.

BACKGROUND

Currently, touch screens applied most widely include resistive touch screens and capacitive touch screens. Specifically, the resistive touch screen has a simple design and a low cost. However, touch for the resistive touch screen is subject to physical limit thereof, and the resistive touch screen has a low transmission rate. In addition, a large detection area with a high number of lines will increase load of a processor, and power consumption is high. Further, application characteristics of the resistive touch screen will result in that the resistive touch screen is easy for ageing, which affects life time of the resistive touch screen. The capacitive touch screen supports multi-point touch, and has a high transmission rate, a low total power consumption and a contact surface with high hardness, and does not require to be pressed, and has a long life time, however, precision of the capacitive touch screen is not enough, and a conductor or a capacitive pen is required to perform an operation.

An urgent technical solution to be solved currently is to design a touch screen which is not limited by insulation of a touch object and has low power consumption and sensitive touch.

SUMMARY

An object of the present disclosure is to provide a touch screen, a method for manufacturing the same and a display panel to solve the above disadvantages in the related art, the touch screen is made of transparent material having piezoelectric effect, and has simple preparation process, and therefore can realize pressure sensing for any object and reduce whole power consumption of the screen effectively.

A touch screen is provided according to an aspect of the present disclosure, which includes a first electrode and a second electrode that are disposed oppositely, and a sensing layer disposed between the first electrode and the second electrode. The sensing layer is made of transparent material having piezoelectric effect.

Optimally, the touch screen further includes transmission lines and a processor, the first electrode and the second electrode are electrically connected to the processor by the transmission lines, respectively. The first electrode and the second electrode are configured to collect an electric signal caused by the sensing layer due to external force, the transmission lines are configured to transmit the electric signal to the processor, and the processor is configured to obtain position coordinates of an action spot of the external force by performing an analysis process on the electric signal.

Optionally, the sensing layer includes a plurality of piezoelectric sensing modules disposed separately, the first electrode includes a plurality of first sub-electrodes, and the second electrode includes a plurality of second sub-electrodes, and the first sub-electrodes and the second sub-electrodes are disposed in pairs, and an electrode pair formed by each first sub-electrode and each second sub-electrode corresponds to one piezoelectric sensing module, each first sub-electrode and each second sub-electrode are electrically connected to the processor by the transmission lines, respectively.

Optionally, a sectional shape of the piezoelectric sensing module is any one shape of a circle, a square and a diamond, a sectional shape of the first sub-electrode and the second sub-electrode is any one shape of a circle, a square and a diamond, and a sectional area of each first sub-electrode and each second sub-electrode is not less than a sectional area of the piezoelectric sensing module corresponding to the each first sub-electrode and the each second sub-electrode.

Optionally, the sensing layer includes a piezoelectric sensing module having a grid shape and combined by a plurality of strip sensors perpendicularly crossing each other, the first electrode includes a plurality of first strip electrodes, and the second electrode includes a plurality of second strip electrodes, the first strip electrode and the second strip electrode are perpendicularly crossing each other. The first strip electrodes are disposed corresponding to strip sensors having a same arrangement direction with the first strip electrodes. The second strip electrodes are disposed corresponding to strip sensors having a same arrangement direction with the second strip electrodes. Each first strip electrode and each second strip electrode are electrically connected to the processor by the transmission lines, respectively.

Optionally, the transparent material having the piezoelectric effect and forming the sensing layer includes a polylactic acid piezoelectric film and/or a piezoelectric ceramic film, the first electrode is made of at least one of indium gallium zinc oxide, indium zinc oxide, indium tin oxide and indium gallium fin oxide, and the second electrode is made of at least one of indium gallium zinc oxide, indium zinc oxide, indium tin oxide and indium gallium tin oxide.

Optionally, a protective layer is disposed at an outer side of the second electrode, and the protective layer is made of glass or organic transparent material.

A method for manufacturing a touch screen is provided according to another aspect of the present disclosure, the touch screen includes a first electrode and a second electrode that are disposed oppositely, and a sensing layer disposed between the first electrode and the second electrode, the sensing layer is made of transparent material and having piezoelectric effect, the method includes:

forming the first electrode, the second electrode and the sensing layer, respectively; and attaching the first electrode and the second electrode to two sides of the sensing layer, respectively.

A method for manufacturing a touch screen is provided according to another aspect of the present disclosure, the touch screen includes a first electrode and a second electrode that are disposed oppositely, and a sensing layer disposed between the first electrode and the second electrode, the sensing layer is made of transparent material having piezoelectric effect, a protective layer is disposed at an outer side of the second electrode, the method includes:

forming the second electrode on the protective layer;

attaching the second electrode to one side of the sensing layer; and forming the first electrode on the other side of the sensing layer.

A display panel is provided according to another aspect of the present disclosure, which includes a display screen and a touch screen disposed at an outer side of the display screen, the touch screen adopts the touch screen described above.

Optionally, the display screen is integrally formed with the touch screen by adhesion.

Optionally, the display screen is any one of a liquid crystal display screen, an OLED display screen and a plasma display screen.

The present disclosure has beneficial effects as follows.

The touch screen according to the present disclosure can sense pressure applied by any object onto the touch screen, and can not only sense a position of a contact, but also sense a magnitude and a change characteristic of acting force. Also, the touch screen according to the present disclosure can directly convert the pressure applied by the object onto the touch screen into an electric signal, which reduces the power consumption greatly, and therefore reduces whole power consumption of the screen effectively, in addition, the touch screen has advantages such as sensitive touch response and multi-point touch support.

Correspondingly, a touch operation of the display panel adopting the touch screen is not limited by insulation of the touch object, and the display panel has low power consumption, which satisfies visual and acoustic enjoyment of users.

DETAILED DESCRIPTION

In order to make those skilled in the art to understand the technical solution of the present disclosure better, a touch screen, a method for manufacturing the same and a display panel according to the present disclosure will be further described in detail hereinafter in conjunction with the drawings and the embodiments.

First Embodiment

Figure 1:
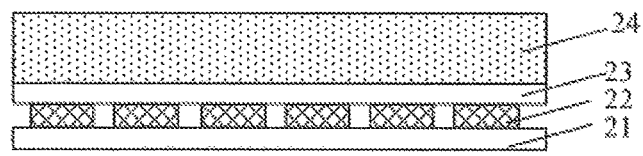
FIG. 1 is a schematic structural diagram of a touch screen according to a first embodiment of the present disclosure.

A touch screen is provided in the embodiment, as shown in FIG. 1, the touch screen 2 includes a first electrode 21 and a second electrode 23 that are disposed oppositely, and a sensing layer 22 disposed between the first electrode 21 and the second electrode 23. The sensing layer 22 is made of a transparent material having a piezoelectric effect.

Specifically, the piezoelectric effect refers to that polarization phenomenon will occur inside of a dielectric in a case that deformation (including bending deformation and scaling deformation) occurs in the dielectric due to external force in a certain direction, and electric signals having opposite polarities occur on two opposite surfaces of the dielectric. The dielectric will recover an uncharged state when the external force is removed, and this phenomenon is referred to as a positive piezoelectric effect. A polarity of the electric signal is changed as a direction of acting force is changed. The sensing layer 22 in the touch screen according to the embodiment is a piezoelectric sensing layer designed based on the piezoelectric effect of the dielectric.

The touch screen made of the piezoelectric material can not only sense position information, but also sense a magnitude of acting force applied onto the touch screen, and can make response to acting force applied by any touch object (no requirement for insulation, including a conductor or a nonconductor) onto the touch screen, and the touch screen has low power consumption, fast and flexible touch response.

Figure 2A:
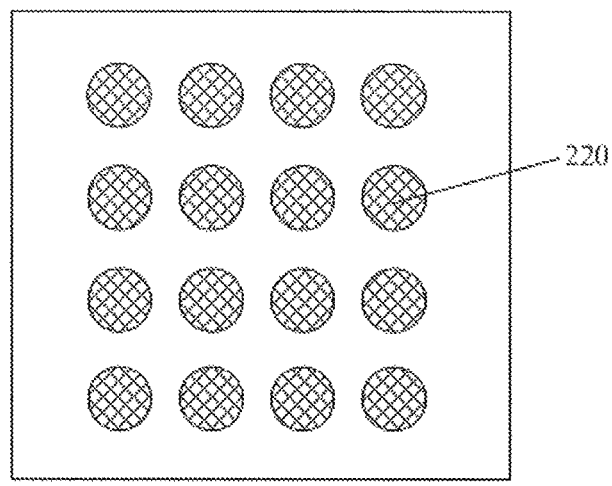
FIG. 2A is a schematic structural diagram of an arrangement of a sensing layer according to the first embodiment of the present disclosure.
Figure 2B:
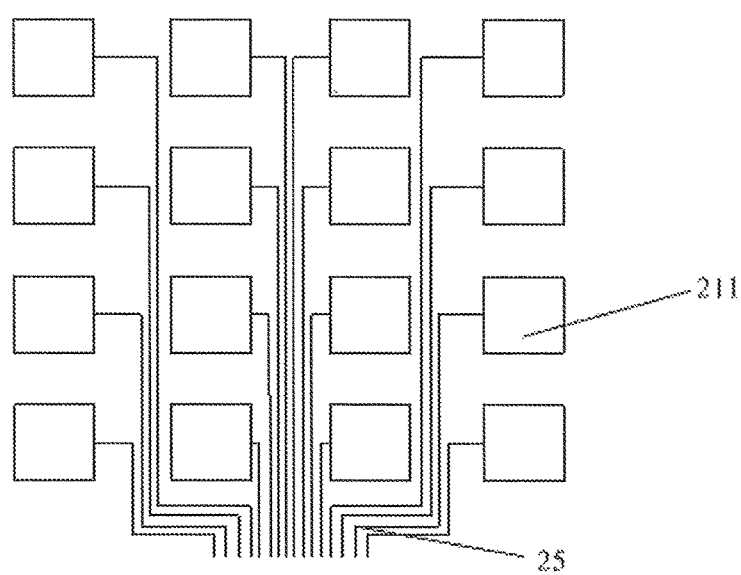
FIG. 2B is a schematic structural diagram of a first electrode in FIG. 2A.
Figure 2C:
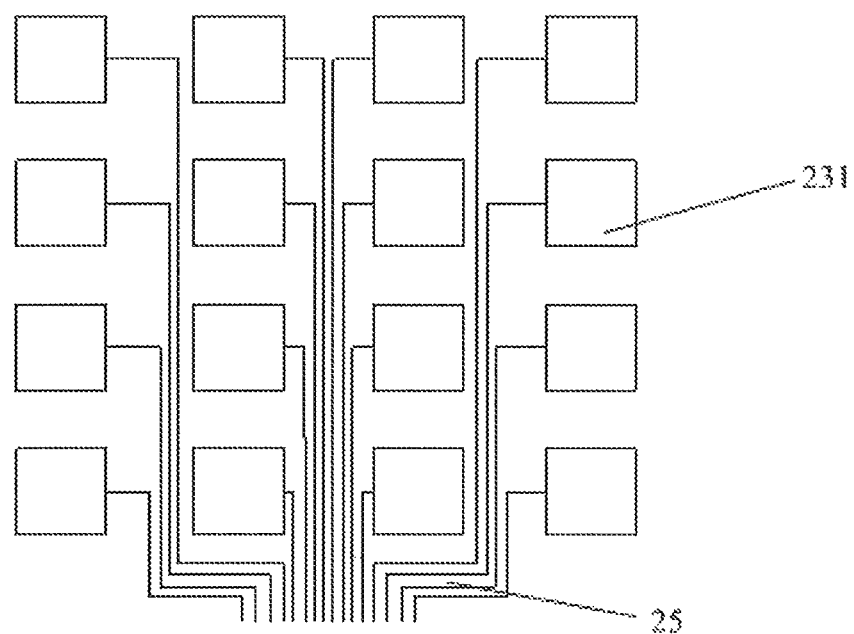
FIG. 2C is a schematic structural diagram of a second electrode in FIG. 2A.

In the embodiment, in order to realize coordinate detection for the touch position, as shown in FIG. 2B and FIG. 2C, the touch screen 2 further includes transmission lines 25 and a processor (not shown in FIG. 2B and FIG. 2C), the transmission line s25 are used to electrically connect the first electrode 21 and the second electrode 23 to the processor, respectively, that is, in the touch screen, the first electrode 21 and the second electrode 23 are connected to the processor by the transmission live 25 and then a loop is formed. The first electrode 21 and the second electrode 23 are configured to collect an electric signal generated by the sensing layer 22 due to the external force, the transmission lines 25 are configured to transmit the collected electric signal to the processor, the processor is configured to perform an analysis process on the collected electric signal inputted by the transmission lines 25, and obtain position coordinates of an action spot of the external force corresponding to the electric signal.

As shown in FIG. 2A to FIG. 2C, the sensing layer 22 includes a plurality of piezoelectric sensing modules 220 disposed separately. The first electrode 21 includes a plurality of first sub-electrodes 211. The second electrode 23 includes a plurality of second sub-electrodes 231. The first sub-electrodes 211 and the second sub-electrodes 231 are disposed in pairs, and one electrode pair formed by each first sub electrode 211 and each second sub electrode 213 corresponds to one piezoelectric sensing module 220, each first sub electrode 211 and each second sub electrode 231 are electrically connected to the processor by the transmission line connected thereto, respectively. Specifically, "separately" means that the plurality of piezoelectric sensing modules 220 are separated from each other in position, and have no electrical connection relation therebetween; correspondingly, after the first sub electrode 211 and the second sub electrode 231 are disposed at two sides of the piezoelectric sensing module 220 in a thickness direction of the piezoelectric sensing module 220, respectively, combinations formed by each separated piezoelectric sensing module 220, the first sub electrode 211 and the second sub electrode 231 disposed at the two sides of the each piezoelectric sensing module, are also disposed separately in position from each other and have no electrical connection relation therebetween, a loop with the processor is formed only in a case that the piezoelectric sensing module 220 is electrically connected to the transmission line 25 via the first sub electrode 211 and the second sub electrode 231.

A real multi-point touch with a high sensitivity can be realized by separate piezoelectric sensing modules 220. In theory, the number of the separate piezoelectric sensing modules is not limited, however, arrangement of the transmission line 25 is limited by process condition, therefore, the separate piezoelectric sensing modules 220 are usually applied to a small-size display screen, for example, a 10-inch display screen.

In the embodiment, a sectional shape of the piezoelectric sensing module 220 disposed separately is any one shape of a circle, a square and a diamond; a sectional shape of the first sub-electrode 211 and the second sub-electrode 231 is any one shape of a circle, a square and a diamond, and a section area of each sub-first electrode 211 and each-sub-second electrode 231 is not less than a sectional area of the piezoelectric sensing module 220 corresponding to the each-first sub-electrode 211 and the each-sub-second electrode 231 (that is, a region area of each of the first sub-electrode 211 and the second sub-electrode 231 is equal to or greater than a region area of the piezoelectric sensing module 220). Circular piezoelectric sensing modules 220 are taken as an example in FIG. 2A, and square first sub-electrodes 211 and square second sub-electrodes 231 are taken as an example in FIG. 2B and FIG. 2C.

It should be understood that the piezoelectric sensing module 220, the first sub-electrode 211 and the second sub-electrode 231 may have a same shape, or different shapes, as long as the sectional area of each of the first sub-electrode 211 and the second sub-electrode 231 is not less than the sectional area of the piezoelectric sensing module 220 corresponding to the each first sub-electrode 211 and the each second sub-electrode 231, and electric signal generated by the piezoelectric sensing module 220 can be transmitted to the processor, the shapes of the piezoelectric sensing nodule 220, the first sub-electrode 211 and the second sub-electrode 231 are not limited here.

In the embodiment, the transparent material having the piezoelectric effect and forming the sensing layer 22 includes a polylactic acid piezoelectric film and/or a piezoelectric ceramic film. Here, "and/or" means that, when the sensing layer includes a plurality of piezoelectric sensing modules 220, the piezoelectric sensing module 220 may be all made of the polylactic acid piezoelectric film or the piezoelectric ceramic film, or a part of the piezoelectric sensing modules 220 may be made of the polylactic acid piezoelectric film and a part of the piezoelectric sensing modules 220 may be made of the piezoelectric ceramic film. With the development of the transparent piezoelectric material in recent years, optical characteristic of the transparent piezoelectric material are improved gradually, and the transparent piezoelectric material can be applied into the display field without affecting the display effect of the display screen. In the embodiment, a piezoelectric touch technology is formed by combining the transparent piezoelectric material with the touch technology. The piezoelectric touch technology is between the resistive touch technology and the capacitive touch technology. The piezoelectric touch screen can support multi-point touch as the capacitive touch screen, and also support a touch operation performed by any object, unlike that the capacitive touch screen only supports a touch operation performed by a conductor or a capacitive pen. In addition, the piezoelectric touch screen can also sense a magnitude and change characteristic of pressure applied by an object thereon.

Optionally, the first electrode 21 and the second electrode 23 are made of at least one of Indium Gallium Zinc Oxide, Indium Zinc Oxide (referred to as IZO), Indium Tin Oxide (referred to as ITO) and Indium Gallium Tin Oxide. The material described above is transparent material, and does not affect the display effect of a display panel or a display device adopting the touch screen.

In order to ensure a normal operation of the touch screen and extend life time of the touch screen, optionally, a protective layer 24 is further disposed at an outer side of the second electrode 23. The protective layer 24 is made of glass or organic transparent material. The protective layer 24 can support and protect the second electrode 23, the sensing layer 22 and the first electrode 21.

When the protective layer is disposed, a touch screen in the embodiment is formed by the following steps:

forming the second electrode 23 on the protective layer 24 by a sputter deposition way;

attaching one side of the sensing layer 22 o the second electrode 23; and forming the first electrode 21 on the other side of the sensing layer 22.

Alternatively, when the protective layer is not disposed, the touch screen in the embodiment is formed by the following steps:

forming the first electrode 21, the second electrode 23 and the sensing layer 22, respectively; and attaching the first electrode 21 and the second electrode to two sides of the sensing layer 22 to form a whole.

In the present disclosure, the way of forming the second electrode onto the protective layer is not limited to the sputter deposition, and may be other way, as long as the second electrode is formed onto the protective layer.

In one embodiment, one operation principle of the touch screen is as follows: acting force applied onto the touch screen acts onto the protective layer 24 first, and deformation will occur in the protective layer 24 (magnitude of the deformation depends on the size of the acting force) doe to the acting force, and the deformation will further make a piezoelectric sensing module 220 at a corresponding position deform, because of direct piezoelectric effect, an electric signal is generated by the piezoelectric sensing module due to the force acted onto the touch screen; the generated electric signal is collected by the corresponding first sub-electrode 211 and the second sub-electrode 231 and transmitted to the processor by transmission lines 25 electrically connected to the first sub-electrode 211 and the second sub-electrode 231. The processor will determine a position of an action spot of the acting force and a magnitude of the acting force by detecting a position where the electric signal is generated and a magnitude of the electric signal, and therefore accurate and fast touch sensing is realized.

The touch screen in the embodiment is a piezoelectric sensing touch screen configured to sense a touch force and position precisely; and has an essential difference from the existing resistive touch screen or capacitive touch screen, which has the following advantages:

non-binary sensing: the pressure applied by the touch object can be directly converted into the electric signal without a driving signal; not only a position of a contact, but also the magnitude and the change characteristics of the acting force can be sensed, and the touch screen has advantages such as a sensitive touch response and multi-point touch support, has a better user experience;

sensing for any object: since the sensing layer is based on positive piezoelectric effect, the touch screen has no demand for outline of the object or whether the object is uninsulated, and can sense any object;

low power consumption: the piezoelectric sensing module can convert the pressure applied by the touch object into the electric signal, which reduces power consumption of the driving signal compared with the capacitive touch screen, thereby realizing that the power consumption is reduced and the whole power consumption of the screen is reduced.

Second Embodiment

A touch screen is provided in the embodiment, a shape or an arrangement way of the sensing layer 22 in the touch screen is different from that in the first embodiment.

Figure 3A:
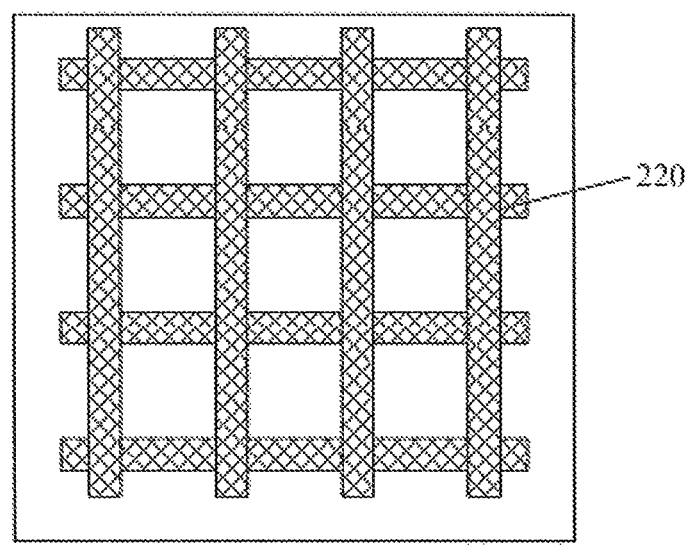
FIG. 3A is a schematic structural diagram of an arrangement of a sensing layer according to a second embodiment of the present disclosure.
Figure 3B:
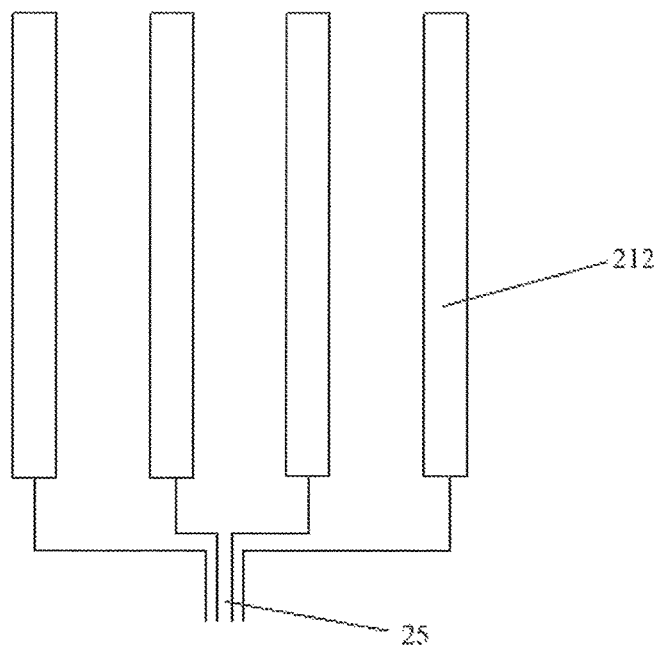
FIG. 3B is a schematic structural diagram of a first electrode in FIG. 3A.
Figure 3C:
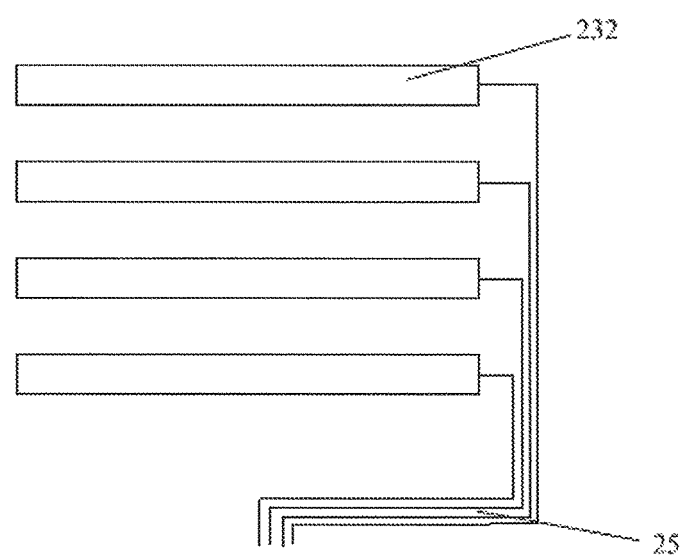
FIG. 3C is a schematic structural diagram of a second electrode in FIG. 3A.

Specifically, as shown in FIG. 3A to 3C, the sensing layer 22 includes a grid piezoelectric sensing module 220 combined by a plurality of strip sensors perpendicularly crossing each other. The first electrode 21 includes a plurality of first strip electrodes 212, the second electrode 23 includes a plurality of second strip electrodes 232. The first strip electrode 212 and the second strip electrode 232 are perpendicularly intercrossed with each other, and disposed corresponding to a strip sensor having a same arrangement direction, respectively. Each first strip electrode 212 and each second strip electrode 232 are electrically connected to the processor by the transmission lines 25, respectively. Specifically, an intersection area of the strip sensors in FIG. 3A does not require a bridge structure (that is, there is no insulating layer therebetween), is just a simple overlapped superposition of a single-layer pattern. When an object touches the piezoelectric touch screen, an electric signal is received by a transverse signal transmission 25 and a vertical signal transmission 25 simultaneously, and coordinates of a touching position can be obtained by calculation of coordinates.

As in the first embodiment, the touch screen in the embodiment has a simple preparation process, and can sense pressure by any object, and further reduce whole power consumption of the screen.

Third Embodiment

A display panel is provided in the embodiment, the display panel includes the touch screen in the first embodiment or the second embodiment.

Figure 4:
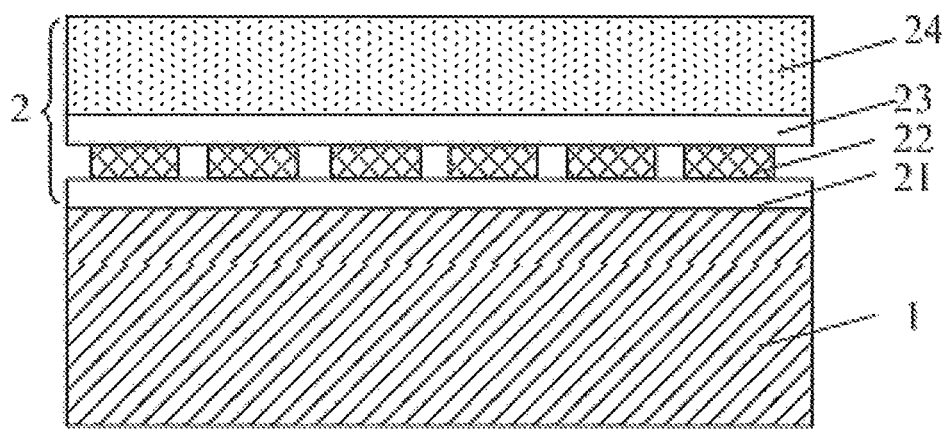
FIG. 4 is a schematic structural diagram of a display panel according to a third embodiment of the present disclosure.

As shown in FIG. 4, the display panel includes a display screen 1 and a touch screen 2 disposed at an outer side of the display screen 1. In the preparation process for the display panel, the display screen 1 and the touch screen 2 are adhered to form a whole by an adhering way.

In the embodiment, optionally, the display panel 1 is any one of a liquid crystal display screen, an OLED display screen and a plasma display screen. The touch screen in the first embodiment or the second embodiment can be adhered to different types of display screen to form a touch display module, a display panel or a display device, which has a simple production process and a low cost.

The display panel may be any product or component having a display function such as a liquid crystal panel, an electronic paper, an OLED panel, a phone, a panel computer, a TV, a display, a notebook, a digital photo frame or a navigator.

A touch operation of the display panel is not limited by insulation of the touch object, and the display panel has low power consumption and can satisfy visual and acoustic enjoyment of people better.

It can be understood that the above embodiments are just exemplary embodiments in order to illustrate a principle of the present disclosure, however, the present disclosure is not limited thereto. For those skilled in the art, various modifications and improvement can be made without departing from the sprint and essence of the present disclosure, and those modifications and improvement will fall within the scope of protection of the present disclosure.

What is claimed is:

1. A touch screen, comprising:
a first electrode and a second electrode disposed oppositely, the first electrode comprising a plurality of first sub-electrodes and the second electrode comprising a plurality of second sub-electrodes,
a sensing layer disposed between the first electrode and the second electrode, made of transparent material having piezoelectric effect, and comprising a plurality of piezoelectric sensing modules, and
a plurality of transmission lines connected with the plurality of first sub-electrodes and the plurality of second sub-electrodes,
wherein the plurality of piezoelectric sensing modules are a plurality of strip sensors arranged to be perpendicular to each other without an insulation layer at intersection areas between the plurality of strip sensors, and each of the first sub-electrodes is disposed corresponding to one of the strip sensors having a same arrangement direction with the first sub-electrode and each of the second sub-electrodes is disposed corresponding to one of the strip sensors having a same arrangement direction with the second sub-electrode.

2. The touch screen according to claim 1, wherein the touch screen further comprises a processor; the first electrode and the second electrode are electrically connected to the processor by the transmission lines, respectively; the first electrode and the second electrode are configured to collect an electric signal caused by the sensing layer due to external force; the transmission lines are configured to transmit the electric signal to the processor; the processor is configured to obtain position coordinates of a spot where the external force is applied by performing an analysis process on the electric signal.

3. The touch screen according to claim 2, wherein each piezoelectric sensing module has a grid shape, both the first sub-electrodes and the second sub-electrodes are strip electrodes; the first sub-electrodes and the second sub-electrodes are perpendicularly intercrossed with each other; each first sub-electrodes and each second sub-electrodes are electrically connected to the processor by the transmission lines, respectively.

4. The touch screen according to claim 3, wherein the transparent material having the piezoelectric effect and forming the sensing layer includes a polylactic acid piezoelectric film and/or a piezoelectric ceramic film; the first electrode is made of at least one of indium gallium zinc oxide, indium zinc oxide, indium tin oxide and indium gallium tin oxide, and the second electrode is made of at least one of indium gallium zinc oxide, indium zinc oxide, indium tin oxide and indium gallium tin oxide.

5. The touch screen according to claim 3, wherein a protective layer is disposed at an outer side of the second electrode and the protective layer is made of glass or organic transparent material.

6. The touch screen according to claim 2, wherein the transparent material having the piezoelectric effect and forming the sensing layer includes a polylactic acid piezoelectric film and/or a piezoelectric ceramic film; the first electrode is made of at least one of indium gallium zinc oxide, indium zinc oxide, indium tin oxide and indium gallium tin oxide, and the second electrode is made of at least one of indium gallium zinc oxide, indium zinc oxide, indium tin oxide and indium gallium tin oxide.

7. The touch screen according to claim 2, wherein a protective layer is disposed at an outer side of the second electrode and the protective layer is made of glass or organic transparent material.

8. The touch screen according to claim 1, wherein the transparent material having the piezoelectric effect and forming the sensing layer includes a polylactic acid piezoelectric film and/or a piezoelectric ceramic film; the first electrode is made of at least one of indium gallium zinc oxide, indium zinc oxide, indium tin oxide and indium gallium tin oxide, and the second electrode is made of at least one of indium gallium zinc oxide, indium zinc oxide, indium tin oxide and indium gallium tin oxide.

9. The touch screen according to claim 1, wherein a protective layer is disposed at an outer side of the second electrode and the protective layer is made of glass or organic transparent material.

10. A display panel, comprising a display screen and a touch screen disposed at an outer side of the display screen; wherein the touch screen adopts the touch screen according to claim 1.

11. The display panel according to claim 10, wherein the display screen is integrally formed with the touch screen by adhesion.

12. The display panel according to claim 11, wherein the display screen is one of a liquid crystal display screen, an organic light-emitting diode (OLED) display screen and a plasma display screen.

13. A method for manufacturing a touch screen, wherein the touch screen comprises a first electrode and a second electrode that are disposed oppositely without arranging a protective layer at an outer side of the second electrode, and a sensing layer disposed between the first electrode and the second electrode, the first electrode comprises a plurality of first sub-electrodes and the second electrode comprises a plurality of second sub-electrodes, the sensing layer is made of transparent material having piezoelectric effect and comprises a plurality of piezoelectric sensing modules, the plurality of piezoelectric sensing modules are a plurality of strip sensors arranged to be perpendicular to each other without an insulation layer at intersection areas between the plurality of strip sensors, and each of the first sub-electrodes is disposed corresponding to one of the strip sensors having a same arrangement direction with the first sub-electrode and each of the second sub-electrodes is disposed corresponding to one of the strip sensors having a same arrangement direction with the second sub-electrode; the method for manufacturing the touch screen comprises:

forming the first electrode, the second electrode and the sensing layer, respectively; and attaching the first electrode and the second electrode to two sides of the sensing layer, respectively, by means of adhesive.

14. A method for manufacturing a touch screen, wherein the touch screen comprises a first electrode and a second electrode that are disposed oppositely, and a sensing layer disposed between the first electrode and the second electrode, the first electrode comprises a plurality of first sub-electrodes and the second electrode comprises a plurality of second sub-electrodes, the sensing layer is made of transparent material having piezoelectric effect and comprises a plurality of piezoelectric sensing modules, a protective layer is disposed at an outer side of the second electrode, the plurality of piezoelectric sensing modules are a plurality of strip sensors arranged to be perpendicular to each other without an insulation layer at intersection areas between the plurality of strip sensors, and each of the first sub-electrodes is disposed corresponding to one of the strip sensors having a same arrangement direction with the first sub-electrode and each of the second sub-electrodes is disposed corresponding to one of the strip sensors having a same arrangement direction with the second sub-electrode; the method for manufacturing the touch screen comprises:

forming the second electrode on the protective layer;

attaching the second electrode to one side of the sensing layer by means of adhesive, after forming the second electrode; and forming the first electrode on the other side of the sensing layer, after attaching the second electrode.

* * * * *